United States Patent [19]

Prosenbauer

[11] Patent Number: 5,114,379
[45] Date of Patent: May 19, 1992

[54] APPARATUS FOR TREATING MEAT

[76] Inventor: Otto Prosenbauer, Innstrasse 23, A-1201 Wien, Austria

[21] Appl. No.: 613,802
[22] PCT Filed: Jul. 28, 1988
[86] PCT No.: PCT/AT88/00057
§ 371 Date: Dec. 19, 1990
§ 102(e) Date: Dec. 19, 1990
[87] PCT Pub. No.: WO90/00011
PCT Pub. Date: Jan. 11, 1990

[30] Foreign Application Priority Data

Jun. 28, 1988 [AT] Austria .................. 1674/88

[51] Int. Cl.$^5$ .............................................. A22C 5/00
[52] U.S. Cl. .................................................. 452/142
[58] Field of Search ........................... 452/142, 141

[56] References Cited

U.S. PATENT DOCUMENTS

| | | | |
|---|---|---|---|
| 478,547 | 7/1892 | Arnold | 452/142 |
| 611,789 | 10/1898 | Milne et al. | 452/142 |
| 1,360,882 | 11/1920 | Carlson | 452/142 |
| 1,991,439 | 2/1935 | Wood | 452/142 |
| 2,135,960 | 11/1938 | Cambell | 452/142 |
| 2,420,549 | 5/1949 | McKee et al. | 452/142 |
| 2,453,334 | 11/1948 | Morgan | 452/142 |
| 2,886,846 | 5/1959 | Meyer | 452/142 |
| 4,270,244 | 6/1981 | Cobrondo et al. | 452/142 |
| 4,343,067 | 8/1982 | Shelton | 452/142 |
| 4,360,952 | 11/1982 | Sampson | 452/142 |

FOREIGN PATENT DOCUMENTS

2491297 4/1982 France.

Primary Examiner—Willis Little
Attorney, Agent, or Firm—Remy J. VanOphem

[57] ABSTRACT

An apparatus for treating meat has several rollers (11 to 14) in a frame (1), which rollers are provided on their surfaces with projections (25), the meat being conveyed from up to down through the gap between each two opposite rollers. Thereby the meat is cut or pressed on its surface. The rollers of each roller pair are driven in opposite directions and transport the meat therebetween (FIG. 1).

5 Claims, 2 Drawing Sheets

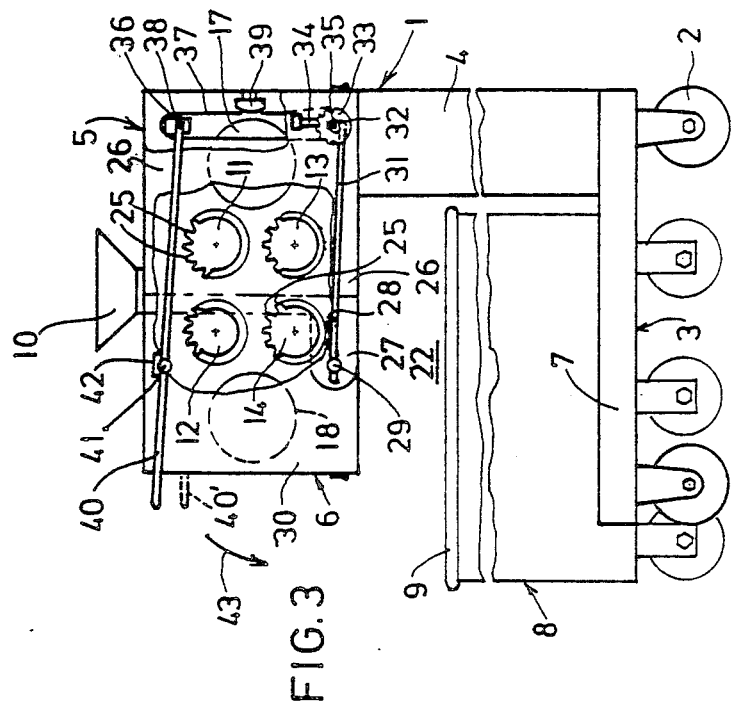
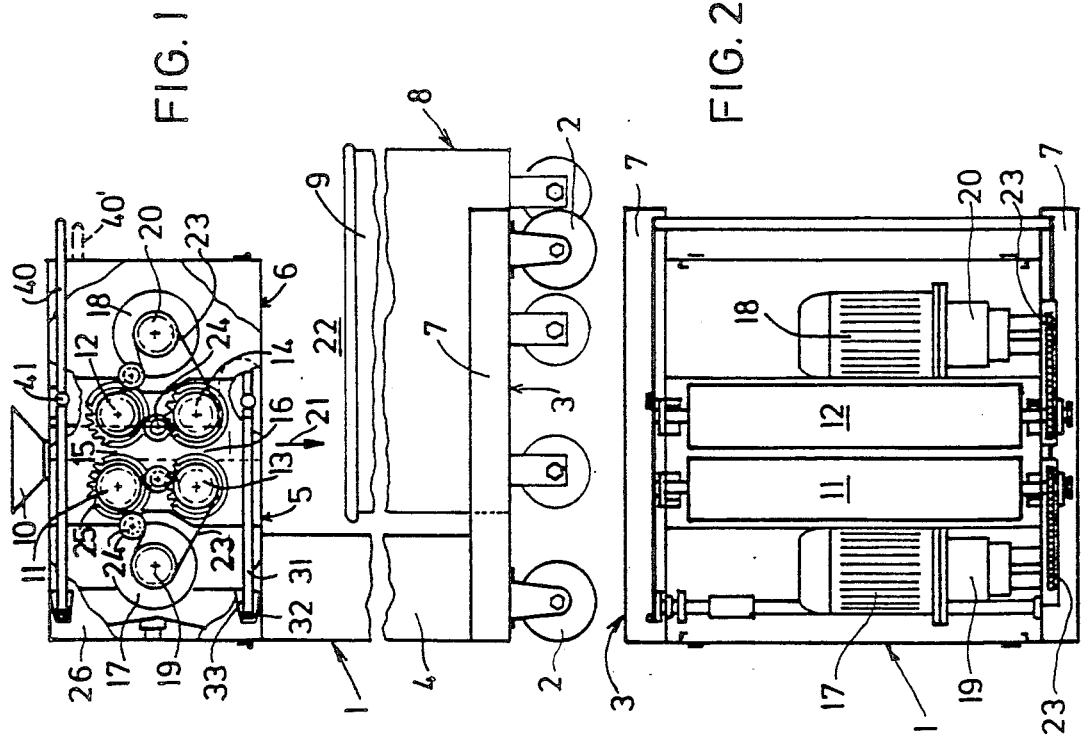
FIG. 3
FIG. 1
FIG. 2

APPARATUS FOR TREATING MEAT

The invention refers to an apparatus for treating meat by applying pressure to the meat by means of at least two pairs of rollers disposed spaced apart from each other and being driven for rotation, which rollers are provided on their circumference with protrusions pressing into the meat passing the rollers, wherein the two rollers of each pair are driven with opposite sense of rotation and transport the meat in the gap between these two rollers from up to down and the sense of rotation of the two rollers of each pair is in transport direction of the meat, and wherein the rollers of at least one roller pair are driven with different peripheral speed and the width of the gap between the rollers of the roller pairs is adjustable.

Apparatus for treating the meat by applying pressure are known in numerous constructions. For example it has become known from the U.S. Pat. No. 4,348,747 to transport the meat lying on a conveyor belt under two rollers disposed side by side and being spaced apart from each other and being driven for rotation in the same direction, which rollers are provided with blunt pyramidal protrusions. In the region of these rollers the conveyor band carrying the meat is abutted from below by resilient plates. Such an apparatus has the drawback of a high wear of the conveyor belt because the pressure of the rollers is almost completely transferred to the conveyor belt or to its resilient abuttment, respectively. Further, a high effort is necessary for the drive means because not only the rollers for themselves but also the conveyor belt must be driven.

An apparatus of the initially described kind is known from the DE-A 3,344,284. In that, the adjustment of the gap between the rollers is done by bearingly supporting the one roller on a swivel arm which by means of a pneumatic cylinder is movable towards the other stationarily beared roller or away from it. This causes difficulties when cleaning the rollers and, if more than one roller pair is provided, a change of the roller gap is not possible in a sufficient versatile manner.

The invention has at its object to improve an apparatus of the last named kind so that a versatile adaptation of the roller gap to different meat qualities or, respectively, meat thicknesses is possible without render difficult the cleaning of the rollers. The invention solves this task in that always one roller of each roller pair is bearingly supported in a box which is parallely shiftable to a further box in which in each case the other roller of each roller pair is bearingly supported, each box having an own motor for driving its rollers, and that the two boxes additionally are swivellable relative to each other. Thereby it is possible to adapt the pressure applied by the rollers to the meat and the pulling or, respectively, stretching effect applied to the meat pieces by the protrusions of the rollers in connection with the different peripheral speed of the two rollers of at least one roller pair to different qualities of meat or, respectively, meat thicknesses. The possibility to swivel the one box relatively to the other box makes the rollers easily accessible for cleaning and replacement purposes and can-if desired-also serve for adjustment of the form of the gap. Provision of an own motor for the rollers of each box saves a change of the drive means of the rollers related to each box, if the two boxes are shifted relatively to each other in order to amend the size of the roller gap.

From the U.S. Pat. No. 2,243,492 it has indeed become known for an apparatus having two roller pairs disposed one above the other, to bearingly support the two rollers of each pair in an own box, the one box being swivellable away from the other box in order to facilitate cleaning of the rollers. However, a change of the width of the gap between the two rollers of each pair is not possible because the two rollers of each pair are coupled by means of pinions in order to introduce the rotational movement from a common driving means, which pinion coupling is loosened when swivelling the one box.

Within the spirit of the invention also more than two roller pairs may be provided. Also when providing a plurality of roller pairs, there occur no substantial friction losses, whereas within an apparatus according to the U.S. Pat. No. 4,348,787 the friction losses increase with each additional roller.

Within the inventive apparatus the roller pairs may also have different peripheral speeds inter se, particularly the two rollers of a lower roller pair may have a higher peripheral speed than the two rollers of an upper roller pair, whereby also a pulling or, respectively, stretching of the meat is achieved when it passes through the passing gap between the rollers. Also this effect can be varied by changing the width of the gap between the rollers of the roller pairs.

According to a preferred embodiment of the invention the two boxes are guided on each other by lateral pins of the one box which slide in slots of the other box, the two boxes being swivellable relativ to each other around the common axis of these pins. This results in a particular simple construction enabling it to as well shift the two boxes parallel to each other as well to swivel them relative to each other.

According to a further embodiment of the invention the two boxes are carried by a post of a frame fixed to that side of the one box which is turned away from the other box, a free space for accommodating a container for receiving the treated meat being provided in the frame below the roller pairs. After removal of the container, this free space also constitutes a space into which the one box can be swivelled down when cleaning the rollers or, respectively, when replacing rollers. Within the scope of the invention a particular favourable construction consists in that the post is fixed on a, preferably mobile, base which, when seen in top plan view, is U-shaped, so that in the space between the legs of the U a carriage carrying the container for the treated meat can be inserted. This enables the use of a roomy container which in its filled condition cannot more be carried by hand, but constitutes the said carriage.

As already mentioned, the possibility to swing the box enables also an easy interchange of the rollers, preferably a plurality of roller sets being provided having different protrusions, for example in the shape of sawtooth-like knives, blunt pyramides or longitudinal ribs having a tooth profile. Thereby the treatment can be varied and adapted to the desired effect in each case. For example, by means of knives a perforation of the meat can be achieved such that the meat surface is opened in the manner of a steaker, connective tissues and meat fibres being cut so that the meat is well tenderized (so-called "steaker effect"). As already mentioned, by means of rollers carrying blunt protrusions, for example in the shape of blunt pyramides, a squeezing of the surface of the meat can be achieved in an advantageous manner, whereby the protein activation is optimized. Longitudinal ribs on the rollers are particularly suitable if the meat is to be pulled or, respectively, stretched, particularly by the aid of a difference of the peripheral speed of the single rollers. By the easy ability to replace the rollers an easy transition from a certain kind of treatment to another certain kind of treatment is as well quickly and easily possible as the combined use of treating tools of different kind, for example steaker knives and, respectively, or stretching ribs and, respectively, or pressing protrusions. Also the use of (protrusions) of the same species, however different longitudinal ribs having a toothed profile. Thereby the treatment can be varied and adjusted to the respective effect desired. For example, by means of knives a perforation of the meat can be achieved so that the meat surface is opened in the manner of a steaker, connective tissues and meat fibres being cut so that the meat is well tenderized (so-called "steaker effect"). As already mentioned, by means of rollers carrying blunt protrusions, for example in the shape of blunt pyramides, squeezing of the surface of the meat can be achieved in an advantageous manner, whereby the protein activation is optimized. Longitudinal ribs on the rollers are particularly suitable if the meat is to be pulled or, respectively, stretched, particularly if a difference in the peripheral speeds of the single rollers is given.

For the said interchangeable bearing of the rollers it is of advantage if each roller is put into a bearing with a projection being provided on its front side, which bearing has a radial slot for guiding the projection, the projection being arrestable in its center position with respect to the bearing by means of a centering pin. After loosening this centering pin the respective roller end can easily be taken off from the bearing and the roller can thereby pulled off and replaced by another roller. Changing over from a certain kind of treatment to another certain kind of treatment, therefore, is as quick and easy possible as the combined use of different treating tools, for example steaker knives and, respectively, or stretching ribs and, respectively, or pressing protrusions. Also the use of protrusions of the same species, however, being different inter se, is possible, for example two pairs of rollers with different steaker knives in each case.

In the drawing the inventive subject is schematically shown by way of exemplative embodiments.

FIG. 1 shows the apparatus seen in axial direction of the rollers from the one side, some elements being broken away.

FIG. 2 is a plan view to FIG. 1.

FIG. 3 shows a side view of the apparatus seen from the other side.

Figure 4:
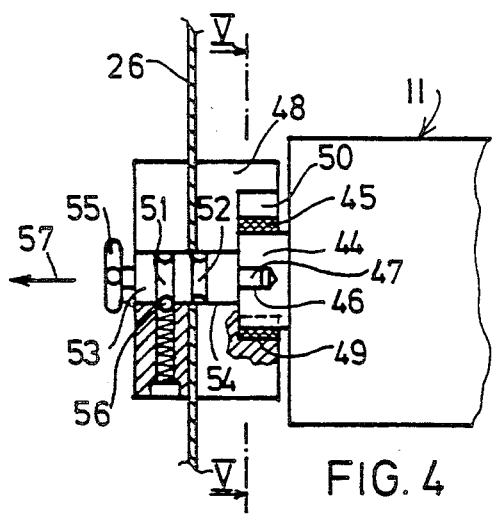
FIG. 4 shows the roller bearing in an axial section through the roller.

The apparatus according to the FIGS. 1 to 3 has a frame 1 which can be travelled by means of wheels 2. The wheels 2 are bearingly supported on a base 3, to the edge of which a post 4 of the frame 1 is fixed which supports two boxes 5, 6 of the frame in the manner of consoles. The base 3 is U-shaped as seen in plane view and therefore is open at one front end so that a carriage 8 can be inserted between the two legs 7 of the base 3, which carriage constitutes a container for the meat treated. The meat to be treated is supplied to the apparatus through a hopper 10 and falls by its own weight to below into the gap between several rollers 11 to 14 which in form of two pairs of rollers are bearingly supported for rotation in the boxes 5 or, respectively, 6, which will be described more in detail later on. The rollers 11, 12 or, respectively, 13, 14 of each pair have horizontal axes and are spaced apart from each other a distance, which distance is adjustable which will be described more in detail later on, so that the gap 15 or, respectively, 16 between the rollers of each roller pair can be increased or decreased. The rollers 11, 13 of each roller pair being in each case disposed to the left hand side with respect to FIG. 1, are bearingly supported in the box 5, the other rollers 12,14 of each roller pair in each case are bearingly supported in the right hand box 6. Each box 5, 6 has an own electromotor 17 or, respectively, 18 for driving its rollers. By different speeds of the motors 17,18 or, respectively, by gear means 19,20 driven by them it can be achieved that the rollers of each roller pair rotate with different speed in order to treat the meat transported to the roller gap 15 or, respectively, 16, for example to pinch and/or to stretch it. The meat supplied through the hopper 10 is gripped by the uppermost rollers 11, 12, is pulled into the gap 15, is supplied to the gap 16 between the rollers 13,14 of the lowermost roller pair and, after having passed this gap 16, it is thrown out to below in direction of the arrow 21 (FIG. 1) into the container 9 of the carriage 8. For accommodation of this container 9 of the carriage 8 there is sufficient free room 22 below the roller gap 16 for installation of the carriage 8. Of course, instead of the carriage 8 also another transport means for the meat to be treated can be used, for example a conveyor belt or the like.

The rollers 11 to 14 are driven by the gears 19,20 via two chain drive means 23 separated from each other. In a manner known per se, tensioning rollers 24 serve for tensioning the chain drive means and to achieve a great angle of embracement.

In order to achieve a good pull-in of the meat to be treated, but also in order to achieve the desired treating effect on the meat, the rollers 11 to 15 are provided with protrusions 25 (FIGS. 6 to 11), which on the single rollers may be identic or different.

In order to adjust the size of the gap 15 or, respectively, 16 between the rollers 11,12 and, respectively, 13,14, the two boxes 5,6 in which the rollers are bearingly supported, can be shifted relative to each other. For this, the box 5 shown to the left in FIG. 1 is rigidly connected to the post 4, whereas the box 6 disposed to the right in FIG. 1 is connected to the box 5 by means of a slide guide means. For this purpose, the stationary box 5 carries below on its two side walls 26 (FIGS. 1,3) tongue-like prolongations 27 provided with horizontal slots 28. Bearing pins 29 (FIG. 3) slide in these slots 28, which pins are fixed to the side walls 30 of the box 6 disposed more spaced apart from the post 4, the side walls 30 being embraced by the prolongations 27 of the side walls 26. The bearing pins 29 on their outer ends are provided with clamping screws in order to secure the adjusted position of the bearing pins 29 in the slots 28. The bearing pins 29 are bearingly supported on the one ends of rods 31, the other ends of which are fixed to excenter pins 32 fixed to excenter discs 33. The one excenter disc 33 (FIG. 3) is formed as a notch disc with a plurality of notches on its periphery, into which notches a spring-loaded securing pin 34 engages thereby securing the rotational position of the excenter disc 33. After lifting the securing pin 34 the excenter disc 33 can be rotated by means of a key attached to the apparatus which key is put onto a hexagon 35 of the excenter disc 33, whereby the bearing pins 29 are shifted in the slots 28 so that the two boxes 5,6 are brought nearer to each other or are disposed a greater distance from each other, whereby the width of the gaps 15,16 between the rollers can be correspondingly adjusted. In order to guide the two boxes 5,6 parallel to each other, further excenter discs 36 are rotatably supported on the two side walls 26 of the box 5 fixed to the post 4, which excenter discs are coupled to the excenter discs 33 by means of chain drive means 37 so that excenter pins 38 fixed to the excenter discs 36 rotate in synchronism with the excenter bolts 32. A chain tensioning means 39 always tensions the chain drive means 37 so that a slip is avoided. Rods 40 are linked to the excenter pins 38, to which rods securing bolts 41 are fixed which engage notches 42 of the side walls 30 of the box 6 and avoid that the box 6 is tilted. The two pairs of rods 31,40, therefore, form a parallel guide means for the box 6 if after lifting the securing pin 34 the excenter lift 33 is rotated by means of the key.

For cleaning and for replacing the rollers 11 to 14 the box 6 can be swivelled away to below around the axes of the bearing pins 29. In order to enable this, only the free ends of the rods 50 must be pressed down so that they arive the position 40' shown with dashed lines in FIG. 3 and the securing pins 51 must be disengaged from the notches 42. The box 6 can then be swivelled down in direction of the arrow 43 (FIG. 3) around the axis of the bearing pins 29 so that the rollers are accessible.

Figure 5:
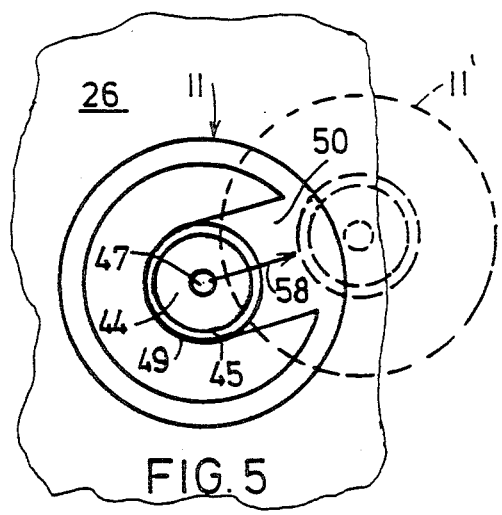
FIG. 5 is a section along the line V—V of the FIG. 4.

In order to make the rollers 11 to 14 easily replacable, the bearing of the rollers at least on one side is so constructed as this is shown in FIGS. 4 and 5 for the roller 11. The roller 11 has a protrusion on its front side which is surrounded by a slide ring 45 of synthetic plastics material and has on its front side end a bore 46 disposed in the axis of the roller 11, in which bore a pin 47 for centering and securing the roller 11 to a slide bearing fixed to the side wall 26 can be inserted. The body of the slide bearing 48 has an opening 49 accommodating the protrusion 44 with the slide ring 45, from which opening a radial slot 50 extends to the outer circumference of the slide bearing 48. Through this slot 50 the protrusion 44 together with the slide ring 45 can be inserted into the slide bearing 48 or, respectively, can be dismounted again, if the pin 47 has been retracted for a corresponding distance. For this, the pin 49 is connected to a bolt 53 provided with two notches 51, 52, which bolt is slidable in axial direction of the roller 5 in a bore 54 of the slide bearing 48 and is provided with a handle 55 on its outer side. A spring-loaded ball securing means 56 cooperates with the notches 51, 52, the ball engaging in one of the two notches 51, 52, thereby securing the bolt 53 in one of two defined positions. In the position shown in FIG. 4, which corresponds to the operating position, the roller 11 is secured against removal from the bearing 48. However, if the bolt 53 is pulled in direction of the arrow 57, the ball securing means 56 is pressed out of the notch 51 and the bolt 53 can be removed for such a distance that the ball securing means 56 snaps into the notch 52. In this position the pin 47 releases the bore 46 and the roller 11 can be dismounted from the bearing 48 in direction of the arrow 58 (FIG. 5) through the slot 50.

The other front side of the roller 11 may be bearingly supported in the same manner, however also by means of a common socket bearing, into which the projection of the roller is inserted.

In this manner not only the rollers can be dismounted for cleaning purposes, but there is also the possibility of an easy change of each roller used heretofore by a roller of different kind. Examples for rollers being differently shaped are shown in FIGS. 6 to 11, always by way of the roller 11, however, of course, all rollers may be designed in the manner which will be described in the following.

Figure 6:
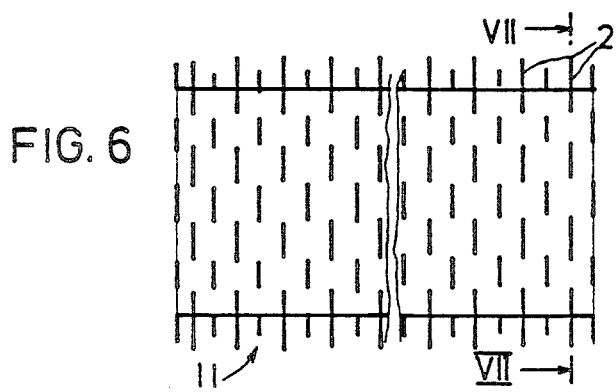
FIGS. 6 to 11 show in side view or, respectively, in section, three embodiments of protrusions disposed on the rollers, the FIGS. 7, 9 and 11 being sections along the lines VII—VII of FIG. 6 or, respectively, IX—IX of FIG. 8 or, respectively, XI—XI of FIG. 10.
Figure 7:
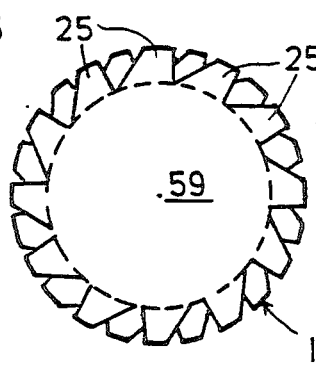

Within the embodiment according to FIGS. 6 and 7 the protrusions 25 of the roller 11 are designed as sawtooth-like knives which are disposed spaced apart from another in rows extending in axial direction of the roller 11 on the surface thereof. In adjacent rows these knives are staggered for the half distance between two adjacent knives of a row. The knives may be provided on knife discs 59 (FIG. 7), for example having a thickness of 0.8 mm, which discs be means of spacer elements are kept spaced apart from each other so that therefore the complete roller 11 is built up of a plurality of knife discs 11 which alternate with spacer elements. By means of the knives the meat running through the apparatus is cut on the surface in the manner of steaker knives. Such treating tools preferably are used on the upper rollers 11, 12 (FIG. 1).

Figure 8:
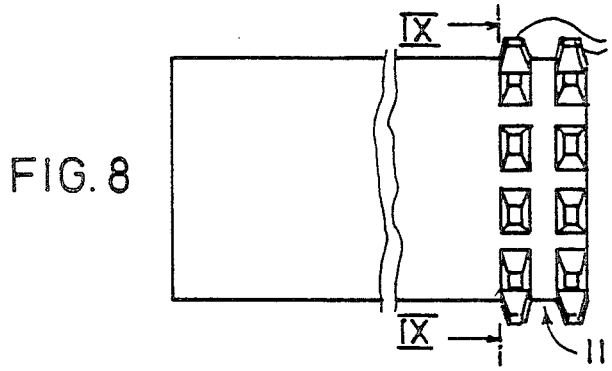
Figure 9:
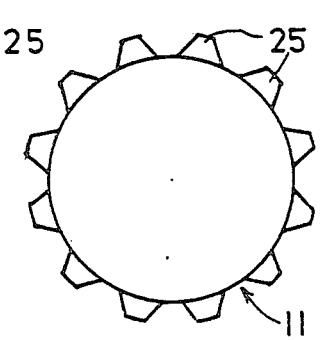

The roller 11 according to FIGS. 8 and 9 is provided on its peripheral surface with blunt pyramidal protrusions 25. By such protrusions 25 the meat is squeezed and pressed or, respectively, torn on its surface. For simplification's sake, in FIG. 8 these protrusions 25 are shown only in two rows on the roller 11, however it is evident, that the complete roller surface may provided with such protrusions 25.

Figure 10:
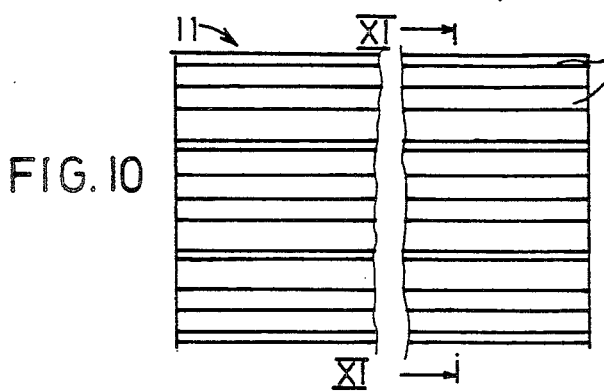
Figure 11:
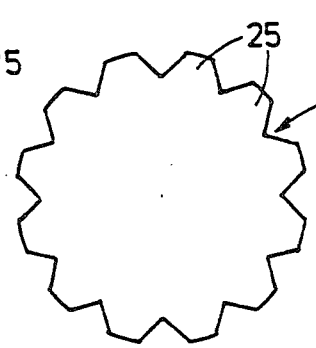

On the roller 11 according to FIGS. 10 and 11 the protrusions 25 are designed as longitudinal ribs running in longitudinal direction of the roller 11 and having a tooth profile. Thereby the meat is squeezed.

Also other form of the protrusions 25 are possible, for example pointed pyramides or cone-shaped protrusions.

All these protrusions 25 except the knives (FIGS. 6, 7) may consist also of synthetic plastics material, for example in form of a suitable coating on the roller.

The described treatment of the meat is suitable also for such kinds of meat which before or after treatment in the described apparatus are subjected to a separate brine treatment, for example by injection of the brine, since the described surface treatment of the meat ensures a better distribution of the brine in the meat and therefore a homogeneous quality of the meat.

It is claimed:
1. An apparatus for treating meat comprising:
    at least two pairs of rollers disposed one above the other, the rollers of each pair of said at least two pairs of rollers being spaced apart from each other a predetermined gap distance, said at least two pairs of rollers having protrusions on their peripheral surface which press into said meat passing each of said at least two pairs of rollers from up to down;
    means for driving said at least two pairs of rollers in an opposite sense of rotation to transport said meat along said predetermined gap distance between said at least two pairs of rollers, said means for driving being juxtaposed said at least two pairs of rollers and rotatably engaging said at least two pairs of rollers for driving communication therewith in a transport direction of said meat, said means for driving said at least two pairs of rollers further comprising;

means for driving each roller of at least one pair of said at least two pairs of rollers at a different peripheral speed; and means for adjusting said predetermined gap distance between said at least two pairs of rollers whereby varying thicknesses of meat may be processed such that meat entering between said protrusions on said peripheral surface of said at least two pairs of rollers may be manipulated along said transport direction of said meat by said rollers of said at least two pairs of rollers;

said means for adjusting said predetermined gap distance comprising a first support member for bearingly supporting one roller of each pair of said at least two pairs of rollers and a second support member for bearingly supporting the other roller of each pair of said at least two pairs of rollers;

means for parallely shifting said first support member and said second support member relative to each other;

means for swivelling said first support member and said second support member relative to each other;

said means for driving said at least two pairs of rollers comprising a first motor carried by said support member for driving said rollers carried by said first support member; and a second motor carried by said second support member for driving said rollers carried by said second support member.

2. An apparatus as claimed in claim 1, wherein said first and second support members comprise lateral pins and lateral slots, said lateral pins sliding in said lateral slots, said lateral pins having a common axis constituting the axis around which said first and second support members can be swivelled relative to each other.

3. An apparatus as claimed in claim 1, further comprising a frame having an upright carrier member fixed to one of said first and second support members on that side of it which is turned away from the other of said first and second support members, a free space being provided below said rollers of said first and second support members for accommodating a container below said at least two pairs of rollers.

4. An apparatus as claimed in claim 3, wherein said upright carrier member is fixed on a base member, said base member having a U-shaped frame portion whereby a carriage carrying said container for the treated meat can be carried into the space between the legs of said U-shaped base member.

5. An apparatus as claimed in claim 4, wherein said U-shaped base member is mobile.

* * * * *